US008465065B2

(12) United States Patent
Browne et al.

(10) Patent No.: US 8,465,065 B2
(45) Date of Patent: Jun. 18, 2013

(54) ACTIVE MATERIAL ENABLED SELF-PRESENTING HANDLES (75) Inventors: Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 641 days.

(21) Appl. No.: 12/043,883

(22) Filed: Mar. 6, 2008

(65) Prior Publication Data

US 2008/0216285 A1    Sep. 11, 2008

Related U.S. Application Data (60) Provisional application No. 60/893,386, filed on Mar. 7, 2007.

(51) Int. Cl.
*E05B 3/00* (2006.01)
*E05B 5/00* (2006.01)

(52) U.S. Cl.
USPC ............. 292/336.3; 296/1.02; 16/110.1

(58) Field of Classification Search
USPC ............. 292/336.3; 296/1.02; 16/110.1
See application file for complete search history.

(56) References Cited

U.S. PATENT DOCUMENTS

| | | | | |
|---|---|---|---|---|
| 4,393,654 A | * | 7/1983 | Pelly | 60/527 |
| 4,407,124 A | * | 10/1983 | Pelley | 60/527 |
| 4,626,085 A | | 12/1986 | Suzuki et al. | |
| 5,226,569 A | * | 7/1993 | Watjer et al. | 224/313 |
| 5,820,205 A | * | 10/1998 | Ammons | 296/214 |
| 6,008,992 A | * | 12/1999 | Kawakami | 361/726 |
| 6,062,614 A | * | 5/2000 | Petzold | 292/336.3 |
| 6,213,548 B1 | | 4/2001 | Van Wynsberghe et al. | |
| 6,367,253 B2 | | 4/2002 | Kutlucinar et al. | |
| 6,390,878 B1 | * | 5/2002 | Zhou et al. | 446/14 |
| 6,431,643 B2 | * | 8/2002 | Grey | 296/214 |
| 6,871,519 B2 | * | 3/2005 | Butera et al. | 70/256 |
| 7,063,377 B2 | * | 6/2006 | Brei et al. | 296/187.09 |
| 7,364,211 B2 | * | 4/2008 | Niskanen et al. | 292/336.3 |
| 7,380,843 B2 | * | 6/2008 | Alacqua et al. | 292/163 |
| 7,585,006 B2 | * | 9/2009 | Alacqua et al. | 292/341.16 |
| 7,631,915 B2 | * | 12/2009 | Browne et al. | 296/1.02 |
| 7,775,573 B2 | * | 8/2010 | Lipke et al. | 296/1.02 |
| 7,775,582 B2 | * | 8/2010 | Browne et al. | 296/180.1 |
| 7,810,852 B2 | * | 10/2010 | Alacqua et al. | 292/201 |
| 7,845,709 B2 | * | 12/2010 | Browne et al. | 296/180.5 |
| 7,866,737 B2 | * | 1/2011 | Browne et al. | 296/193.1 |
| 2004/0031301 A1 | * | 2/2004 | Dominique | 70/237 |
| 2005/0062329 A1 | * | 3/2005 | Alacqua et al. | 297/378.12 |
| 2007/0063544 A1 | * | 3/2007 | Browne et al. | 296/187.09 |
| 2008/0133090 A1 | * | 6/2008 | Browne et al. | 701/49 |
| 2008/0217941 A1 | * | 9/2008 | Chernoff et al. | 296/1.02 |
| 2009/0108607 A1 | * | 4/2009 | Browne et al. | 296/1.02 |

FOREIGN PATENT DOCUMENTS

| | | | |
|---|---|---|---|
| DE | 19731325 | * | 1/1999 |
| DE | 19747703 | * | 5/1999 |

* cited by examiner

*Primary Examiner* — Carlos Lugo (57) ABSTRACT

A self-presenting handle assembly, comprising a handle portion in operative communication with an axle rotatably mounted in a housing of a rigid support, and an active material in operative communication with the axle or the handle portion, wherein the active material is configured to undergo a change in at least one property upon receipt of an activation signal, wherein the change in at least one property is effective to provide rotation of the axle in a first direction and move the handle in the first direction from a first position to a second position.

12 Claims, 5 Drawing Sheets

ACTIVE MATERIAL ENABLED SELF-PRESENTING HANDLES

CROSS-REFERENCES TO RELATED APPLICATIONS

This U.S. Non-Provisional patent application claims the benefit of like titled and pending U.S. Provisional application Ser. No. 60/893,386 filed on Mar. 7, 2007.

BACKGROUND

The present disclosure generally relates to stowable handles which adopt a functional geometry only upon demand and in so doing present this functional geometry to the user. These handles will be termed self-presenting handles and this disclosure particularly addresses self-presenting handles having active materials.

Many vehicles include grab handles (i.e., assist handles) and garment hooks that are fixed to the roof liner and/or A-pillars of the vehicle. Most, if not all, of these handles are infrequently used but are permanently fixed to the vehicle's interior. For example, in many cases, the handles permanently occupy interior space and affect interior styling design. In other cases, the handles are spring loaded stowable, thereby reducing the amount of interior space occupied by the handle when not in use. Such stowable handles, however, can be difficult for a user to locate and grasp when entering and exiting the vehicle.

Accordingly, there is a need for improved self-presenting handles that do not affect styling designs or aesthetics and increase interior compartment space.

BRIEF SUMMARY

Disclosed herein are active material enabled self-presenting handles in accordance with exemplary embodiments. In one embodiment, a self-presenting handle assembly includes a handle portion in operative communication with an axle rotatably mounted in a housing of a rigid support, and an active material in operative communication with the axle or the handle portion, wherein the active material is configured to undergo a change in at least one property upon receipt of an activation signal, wherein the change in at least one property is effective to provide rotation of the axle in a first direction and move the handle in the first direction from a first position to a second position.

In another embodiment, a self-presenting handle assembly, includes a handle portion in operative communication with an axle rotatably mounted in a housing of a rigid support, a first shape memory alloy in operative communication with the axle, wherein the shape memory alloy is configured to undergo a contraction in a length dimension upon receipt of a first heat signal, wherein the contraction in a length dimension is effective to provide rotation of the axle in a first direction and move the handle in the first direction from a stowed position relative to a vehicle interior surface to a presented position relative to the vehicle interior surface, a detent in operative communication with the handle portion configured to hold the handle portion in the presented position, wherein the detent comprises a second shape memory alloy configured to undergo a contraction in a length dimension upon receipt of a second heat signal, wherein the contraction in a length dimension is effective to release the detent from handle portion; and a bias spring in operative communication with the axle configured to provide rotation of the axle in a second direction counter to the first direction upon deactivation of the first and second heat signals, wherein rotation of the axle is effective to move the handle portion from the presented position back to the stowed position.

A method of self-presenting a handle in a vehicle includes, activating an active material in operative communication with the axle or the handle portion, wherein the active material is configured to undergo a change in at least one property upon receipt of an activation signal, wherein the change in at least one property is effective to provide rotation of the axle in a first direction and move the handle in the first direction from a first position to a second position.

BRIEF DESCRIPTION OF THE DRAWINGS

Referring now to the figures, which are exemplary embodiments and wherein the like elements are numbered alike.

DETAILED DESCRIPTION

Self-presenting handles and methods of their use are described herein. In contrast to existing handles and/or garment hooks, the self-presenting handles disclosed herein advantageously employ active materials. The self-presenting can include any type of handle where stowing and presenting are advantageous, such as for example, grab handles (i.e., assist handles) in a vehicle. The self-presenting handles as described comprise an active material which permits the device to reversibly present itself in response to a change in a property of the active material upon receipt of an activation signal.

The term "active material" as used herein generally refers to a material that exhibits a change in a property such as dimension, shape, phase, orientation, stiffness, and the like upon application of an activation signal. Suitable active materials include, without limitation, shape memory alloys (SMA), ferromagnetic shape memory alloys (MSMA), shape memory polymers (SMP), piezoelectric materials, electroactive polymers (EAP), magnetorheological (MR) elastomers, electrorheological (ER) elastomers, and the like. Depending on the particular active material, the activation signal can take the form of, without limitation, an electric current, an electric field (voltage), a temperature change, a magnetic field, a mechanical loading or stressing, and the like.

In other embodiments, the self-presenting handles can comprise electromechanical, electrohydraulic, electromagnetic, and the like actuation mechanisms, rather than active materials, to present the handle to a user. In these embodiments, the electromechanical actuator, for example, can be initiated by an electrical signal and is configured to transition the handle from a stowed position to a presented position. A reverse in the electrical signal is effective to return the handle to the stowed position.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). Furthermore, all ranges disclosed herein are inclusive of the endpoints and independently combinable.

Figure 1:
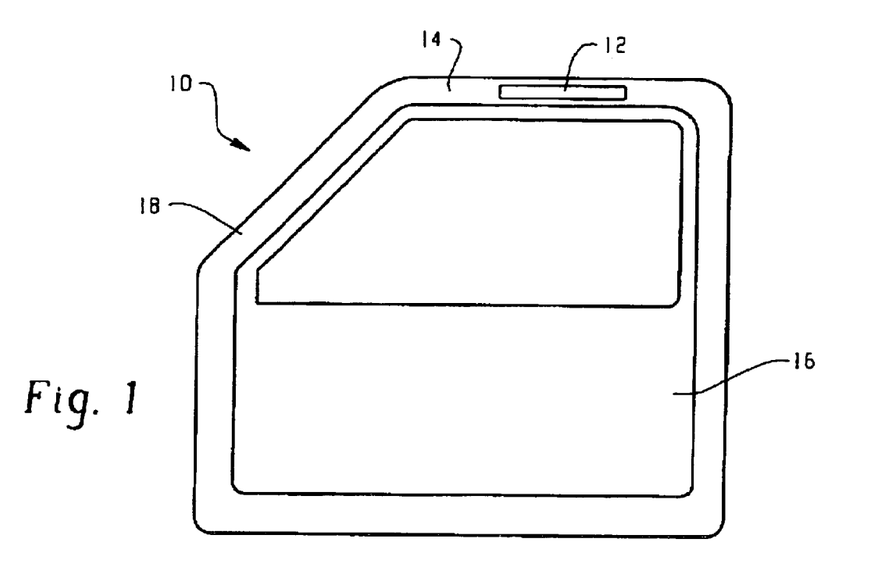
FIG. 1 is a perspective view of a vehicle interior compartment with an active material enabled self-presenting handle assembly.

Referring now to FIG. 1, a partial perspective view of a vehicle interior compartment is shown and generally designated by reference numeral 10. In this embodiment, a self-presenting handle assembly 12 (in this case a grab/assist handle) is in physical communication with a surface of a vehicle interior, in this case the roof line of the vehicle interior compartment 10, just above the vehicle door 16. In another embodiment, the handle assembly 12 can be located on the vehicle's A-pillar 18. While this figure illustrates a self-presenting handle assembly 12, it is to be understood that the active material enabled self-presenting handle assembly as disclosed herein can also be applied to a garment hook, and can be disposed anywhere in the vehicle.

In FIG. 2, an exemplary embodiment of the self-presenting handle assembly 12 is shown in greater detail. The self-presenting handle assembly 12 comprises a handle portion 20 and axles 22 in operative communication with the handle portion. The axles 22 are rotatably mounted in a housing 23 of a rigid support 24. In one embodiment the rigid support 24 can be mounted directly to the vehicle interior 10, such as on the roof liner 14. The axles 22 are configured to permit rotation of the handle portion 20 from a first position to a second position.

Figure 2A:
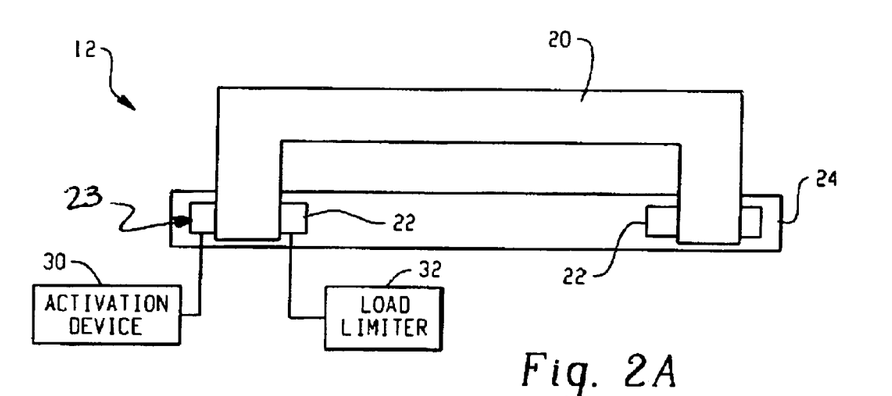
FIG. 2 is an exemplary embodiment of an active material enabled self-presenting handle in (a) a first position, (b) a second position.
Figure 2B:
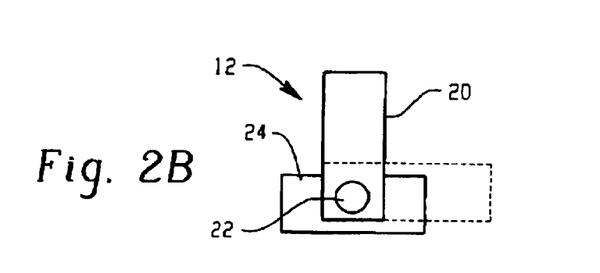
Figure 3:
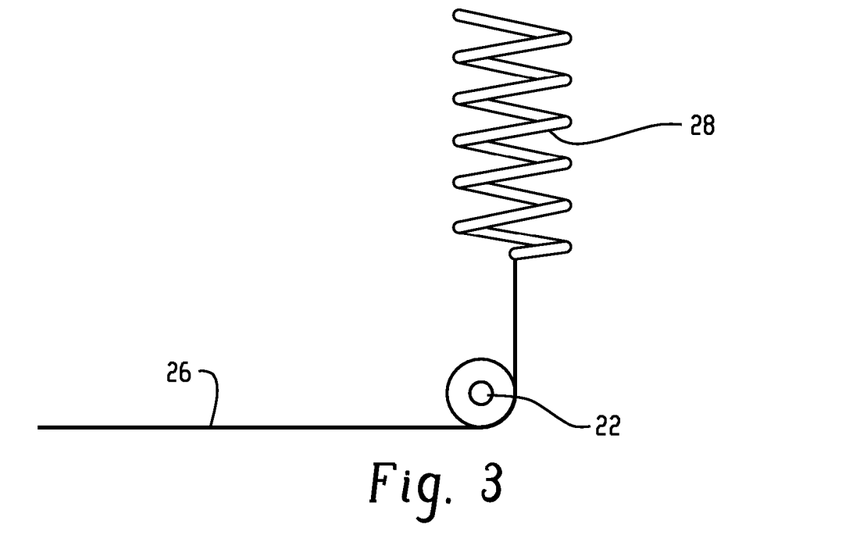
FIG. 3 is an exemplary embodiment of an axle in communication with an active material and a return mechanism.

Turning now to FIG. 3, one of the axles 22 is illustrated in greater detail. In this embodiment, the handle assembly 12 further includes an active material 26 and a return mechanism 28. In this embodiment, the active material 26 comprises an SMA wire in operative communication with the axle 22 and the return mechanism 28, in this case a bias spring. Upon receipt of an activation signal, the active material 26 is configured to undergo a change in a property. The change in the property of the active material 26 is effective to provide rotation of the axle 22 in a first direction and move the handle portion 20 from the first position to a second position. In another embodiment, the active material 26 can be directly connected to the handle portion 20 to provide the rotation. Turning back to FIG. 2 briefly, the first position is where the handle portion 20 is in a stowed position relative to the surrounding surface (as shown in FIG. 2(a)).

The second position is where the handle portion 20 is in a presented position relative to the surrounding surface and can be used by a passenger. FIG. 2(b) is a side perspective view of the self-presented handle assembly 12 with the dashed lines illustrating the second position of the handle portion 20. Movement in the first direction caused by the active material 26, therefore, is effective to move the handle portion 20 from the stowed to the presented position. In another embodiment, the first position can be the presented position and the second position is the stowed position. Movement in the first direction caused by the active material, in such an embodiment, would be effective to move the handle portion 20 from the presented to the stowed position. As used herein, the term "stow" generally refers to a position of the self-presenting handle which occupies less vehicle interior space over existing vehicle handles and the self-presenting handle itself when in the presented position. For example, in one embodiment, the self-presenting handle when stowed is recessed into the vehicle interior compartment 10, such that the handle portion 20 is coplanar (i.e., flush) with the roof liner 14. In another embodiment, the self-presenting handle is simply folded against the roof liner 14 to increase interior compartment space, but is not completely recessed into the vehicle interior, such that the surfaces of the self-presenting handle and the roof liner are not coplanar.

Figure 4:
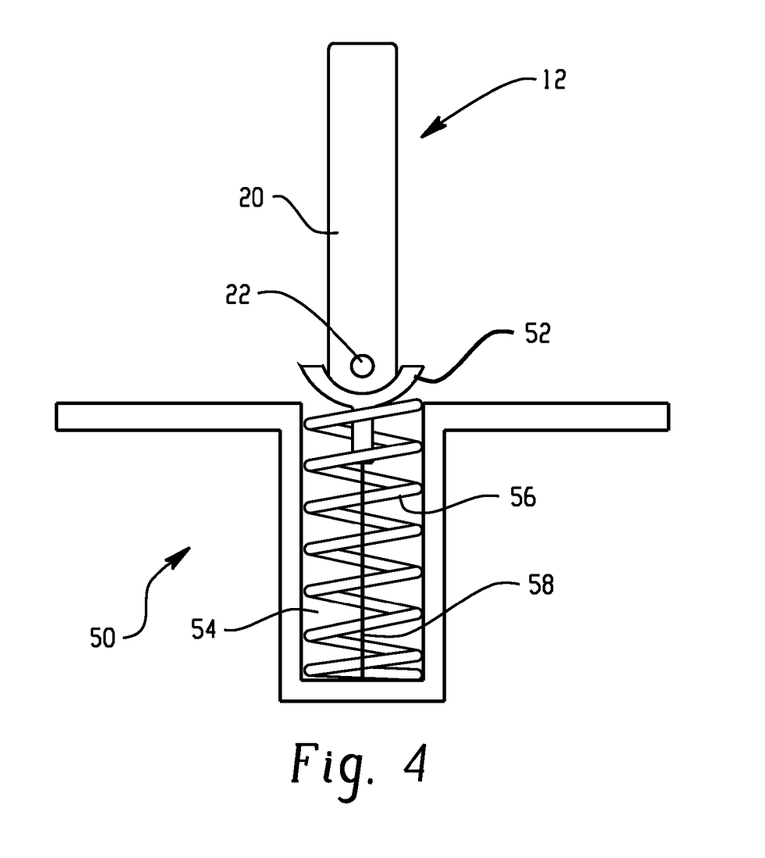
FIG. 4 is an exemplary embodiment of a detent for an active material enabled self-presenting handle.

In operation, the SMA wire (i.e., active material) 26, which is martensitic at room temperature, is heated to its austenitic state by electric resistance heating (electrical wires not shown) and contracts in a length dimension. The contraction is effective to overcome the restraining force exerted by the bias spring 28, which can be mounted between the axle 22 or handle portion 20 and the rigid support 24. In this embodiment, the bias spring 28 is configured to provide rotation of the axle 22 in a second direction counter to the first direction upon discontinuation of the activation signal being applied to the SMA wire 26. The second direction is effective to return the handle portion 20 to the stowed position. In another embodiment, the bias spring 28 can be configured to move the handle portion 20 from the stowed to the presented position when not acted on by the SMA wire 26. The SMA wire 26 must be continually heated even after the handle portion 20 is deployed to prevent reversion of the SMA wire 26 to the soft, martensitic state under which the bias spring 28 would stretch the SMA wire and return the handle portion 20 to the first position. In order to have the handle portion 20 remain presented even when heat is removed from the SMA wire 26, a locking mechanism or a detent can be used. A detent 50, as part of the self-presenting handle assembly 12, is illustrated in FIG. 4.

The detent 50 is configured to interact and interfere with the handle portion 20 being returned by the bias spring 28. The detent 50 comprises a catch 52 in slidable communication with a complementary cavity 54. The catch 52 is forced outward by a compression spring 56 located in the cavity 54. A length of another SMA wire 58 extends from the base of the cavity 54 to the underside of the catch 52. In operation the actuation of the self-presenting grab handle assembly 12 causes the axels 22 to rotate and move the handle portion 20. As the handle portion 20 reaches the presented position, an end of the handle encounters the catch 52 and the shape of the catch 52 is configured to lock the end of handle portion 20 in the presented position. While the detent 50 is effective to frictionally engage the handle portion 20 in the presented position, the shape of the catch 52 is further configured to permit some movement of the handle portion 20.

For example, the handle portion 20 can rotate within the U-shape of the catch 52 to permit movement (e.g. fumbling or wiggling) as a passenger makes use of the handle, without allowing the handle to move completely out of the catch 52, which would cause the handle to stow. Activating of the SMA wire 58 and discontinuation of the activating signal to the SMA wire 26 will retract the catch 52 downward such that the axles 22 are able to rotate and the bias spring 28, attached to the handle portion 20, will move the handle portion in the opposite direction back to the stowed position, clearing the retracted catch 52. The SMA wire 58 in the detent 50 can then be deactivated to return the self-presenting handle assembly 12 to a fully deactivated, stowed state. Also, the properties of SMA, as well as other suitable active materials, will be discussed in more detail below.

In another embodiment, which may be desirable if the force necessary to depress the detent 50 during deployment is excessive, would be to synchronize the operation of the SMA wires 26, 58 in both the self-presenting handle 12 and the detent 50 so that both are actuated independently by their individual SMA elements. Again, upon achieving a presented configuration, the supply of current to the SMA wires can be discontinued until stowage of the handle is again desired. It is to be understood that the detent 50 as described above is an exemplary embodiment. Other embodiments of detents that advantageously provide a detent region for the handle portion in its presented state, even after the active material is deactivated, are suitable.

Figure 5A:
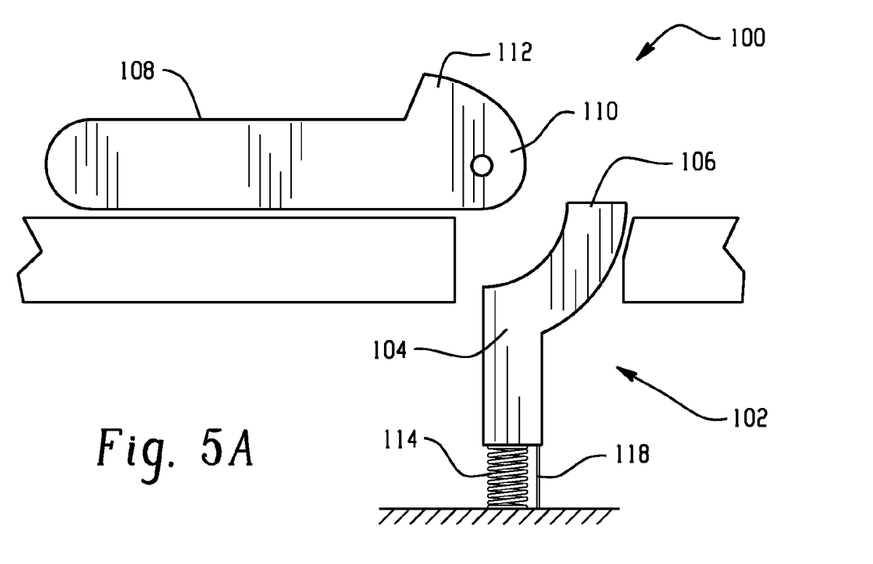
FIG. 5 is another exemplary embodiment of a detent for an active material self-presenting handle.
Figure 5B:
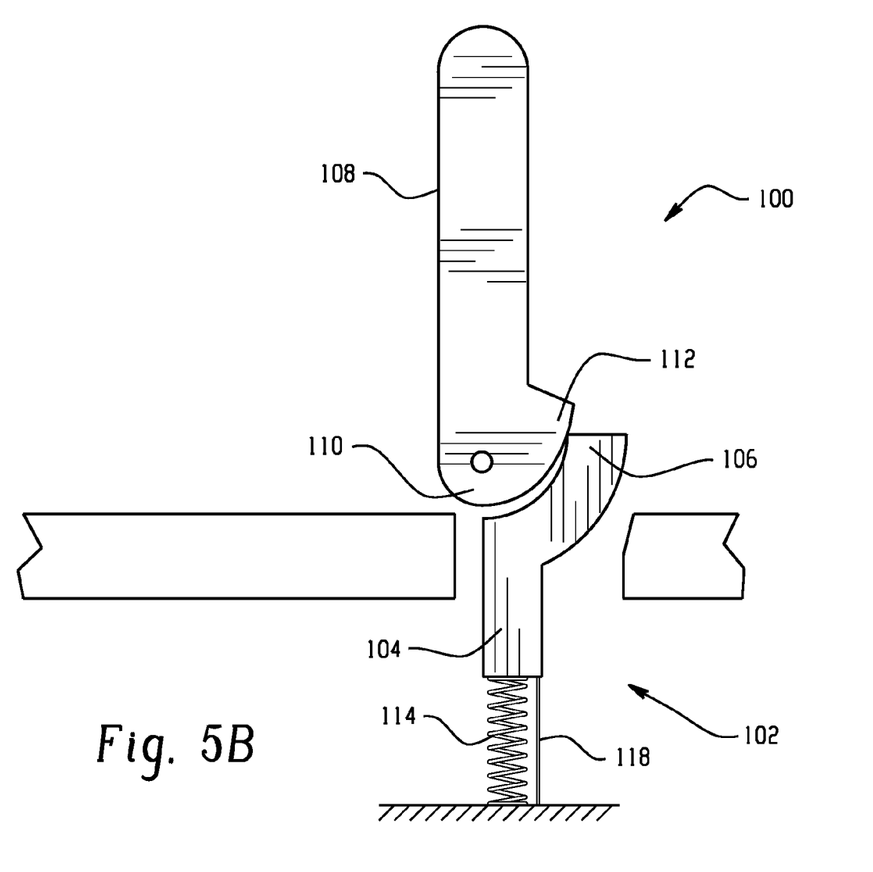

For example, FIG. 5 illustrates another exemplary embodiment of a handle assembly 100 comprising a detent 102. In this embodiment, the detent 102 operates in the same manner as the detent 50 of FIG. 4, but the shape of the catch 104 has only one lip 106, which is configured to engage the handle portion 108. The handle portion 108 has an end 110 with an increasing radius on a first side 112. The increasing radius of the end 110 is configured to engage the lip 106 of the catch 104 as the handle transitions from the stowed to the deployed position as can be seen in Figures (a) to (b).

The upward force of the compression spring 114 on the catch 104 and the increasing radius of the end 110 are sufficient to hold the handle portion 108 in the deployed position. As described above, an SMA wire 118 can be used to retract the detent 102 and permit stowing of the handle portion 108 upon absence of an activation signal or release of a locking mechanism (not shown).

Figure 6A:
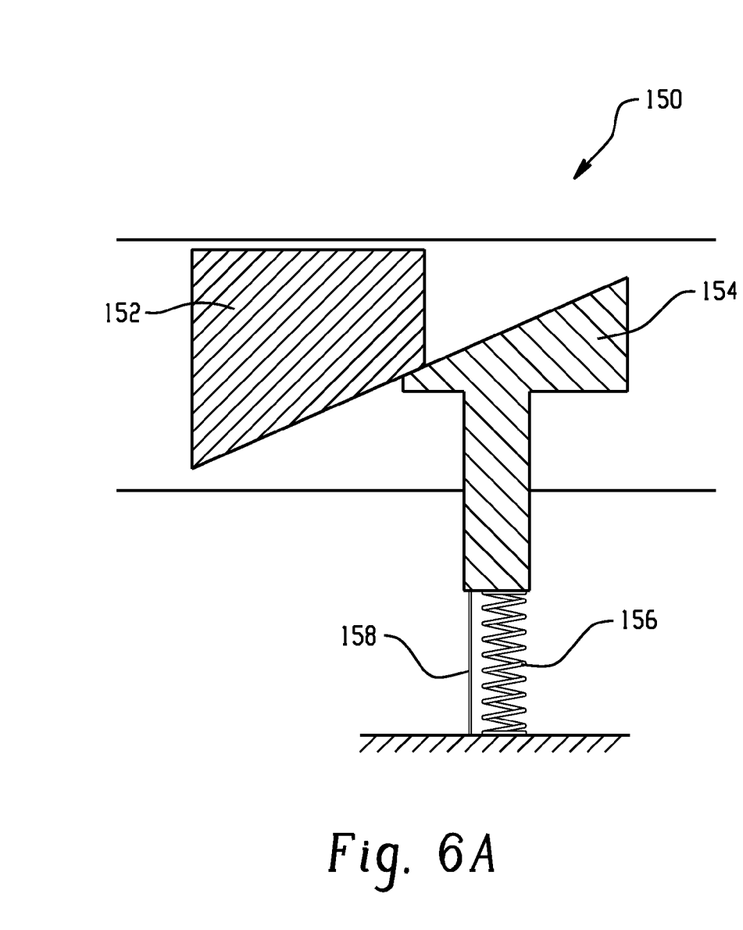
FIG. 6 is yet another exemplary embodiment of a detent for an active material self-presenting handle.
Figure 6B:
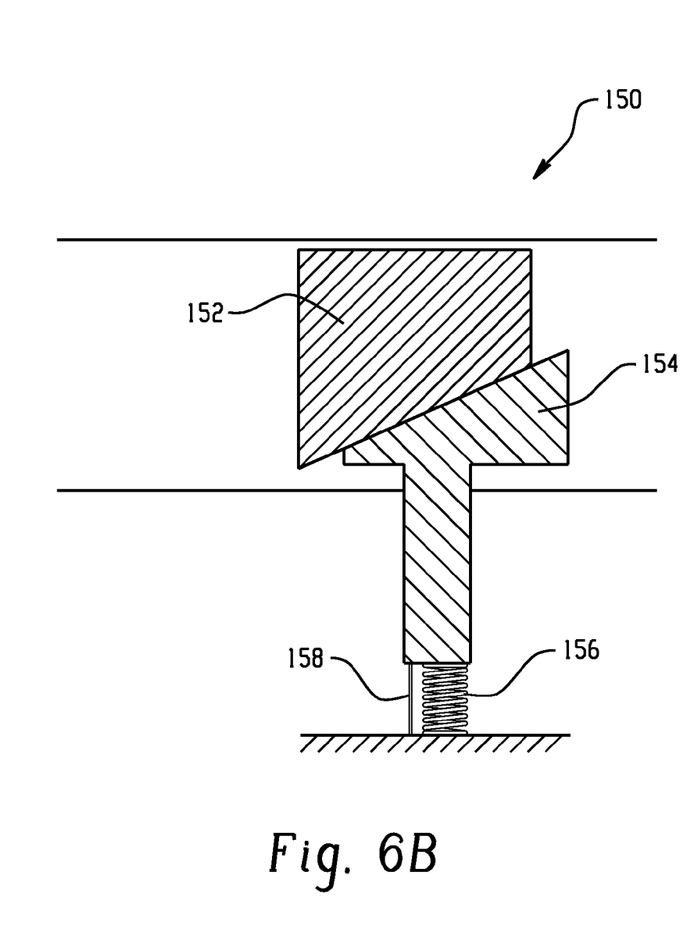

Turning now to FIG. 6, another exemplary embodiment of a detent 150 is illustrated. The detent 150 comprises two wedge shaped bodies 152 and 154 that are in slidable communication with each other. FIG. 6(a) shows the detent in a disengaged position wherein the handle portion (not shown) would be stowed. FIG. 6(b) illustrates the detent 150 in the engaged position wherein the handle portion would be held in the deployed position. The sliding movement of the two contacting wedge shaped bodies 152 and 154 causes the wedges to move perpendicularly with respect to one another.

This sliding motion compresses a compression spring 156, thereby building up force in the spring and increasing resistance to further sliding of the wedge shaped body 152 to the point that it matches the activating force of the of a primary SMA wire (not shown) transitioning the handle portion to the deployed position. The force in the compression spring 156, as shown in FIG. 6(b), stops further relative movement of the wedge shaped body 152, i.e., holds the handle portion in place until released by the activation and contraction of a secondary SMA wire 158 in operative communication with the wedge shaped body 154. With respect to the wedge shaped body 152, the relative sliding movement can be driven by any suitable means, for example, it can be mechanically driven by gear teeth disposed at the pivot end of the handle portion in operative engagement with slots on top of the wedge shaped body 152.

Figure 7A:
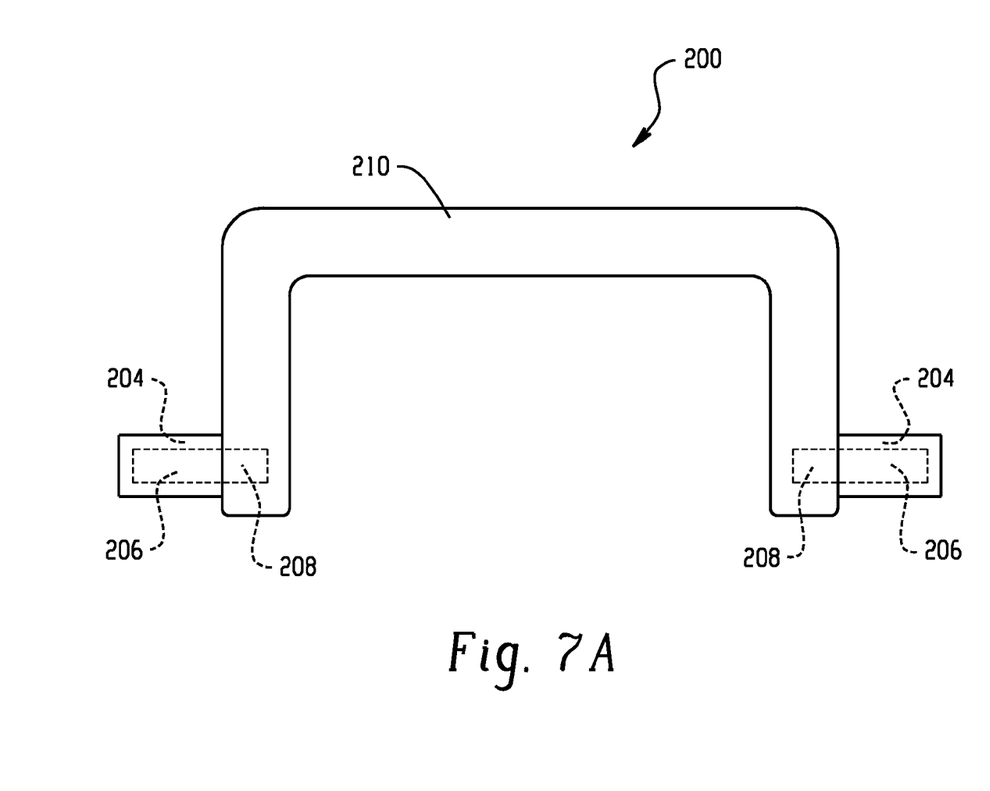
FIG. 7 is an exemplary embodiment of a self-presenting handle.
Figure 7B:
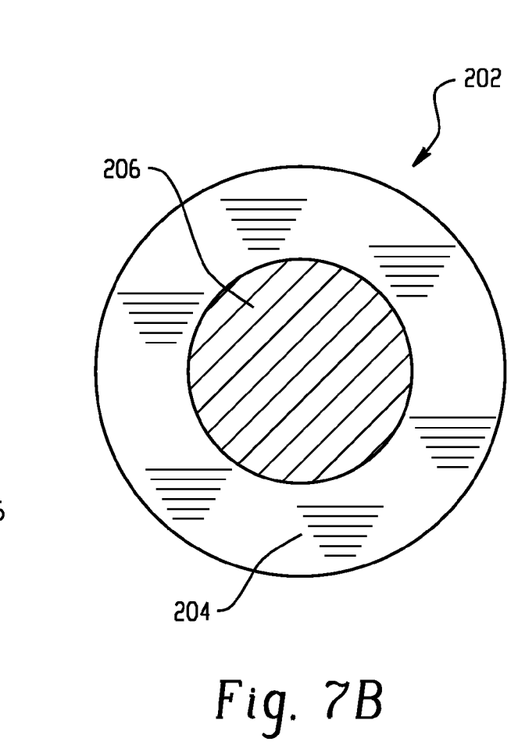

Yet another embodiment of a handle assembly 200 comprising a detent mechanism 202 is shown in FIG. 7(a). The detent 200 comprises a controllable shear strength MR fluid or ER fluid 204, shown in FIG. 7(b), wherein the change in shear strength upon receipt of a magnetic or electrical signal is effective to produce rotational resistance on shafts 206 at the pivot/rotation points 208 of the handle portion 210. A permanent magnet could be used to set a level and then coil activation could be used to cancel the field and release the detent 200. Alternatively power could be used to create a field and activate the detent 200 as well as set its release force level, wherein turning off the power would release the detent 200. In this case no permanent magnet is required. In still other embodiments, the detent does not need to comprise an active material component.

Another optional feature of the self-presenting handle assembly is a locking mechanism, which can be used in place of or in conjunction with the detent 50. The locking mechanism is configured to hold the handle portion 20 in a selected one of the first and second positions after deactivation of the active material. Suitable locking mechanisms can include, without limitation, a pin, a tongue in groove, a latch, a stop, and the like. When it is desired, the detent and/or locking mechanism can be released and a return mechanism, such as the bias spring 28, or a second active material component, can move the handle portion from a selected one of the first and second positions to the opposite position.

The self-presenting handle 12 as described above and shown in FIG. 2, is just one exemplary embodiment of the disclosed self-presenting handle. In another embodiment, the handle 12 can be deployed by an active material, such as the SMA wire; a detent can hold the presented position of the handle; and an antagonistic SMA wire can be used to return the handle to its stowed position, rather than a bias spring. In this example, the antagonistic SMA wire acts as the return mechanism. Upon deactivation of the first SMA wire, and release of the detent, the second (antagonistic) SMA wire can be activated, wherein the contraction of the second SMA wire is effective to rotate the axles and move the handle back to the stowed position.

In yet another embodiment, the self-presenting handle assembly comprises a secondary antagonistic SMA wire in austenitic phase. When the secondary SMA wire is stressed/strained during handle deployment, the wire shifts to the lower modulus martensitic phase, i.e., employing the superelastic effect of the SMA wire. The secondary antagonistic SMA wire is then used to stow the handle in one of two ways. When the handle is manually moved out of the detent region, release of stress on the secondary SMA wire will return the wire to the austenitic phase and cause it to contract in a length dimension and stow the handle. Alternatively, when the detent has been pulled away such as by a sensor based activation signal for example, this then also releases the stress and causes the antagonistic SMA wire to revert to the austenitic phase which causes the wire to shrink and the handle to stow.

In yet another embodiment, the self-presenting handle assembly 12 can further include a ratchet mechanism, wherein the ratchet mechanism is configured to allow deployment of the handle portion 20 to occur at various angles. The ratchet mechanism can further be active material based. In one example, the ratchet mechanism employs multiple active material components, such as SMA wires, wherein each wire is configured to actuate and present the handle portion 20 to a particular angle with respect to the vehicle interior compartment 10. Controlled time actuations of each SMA wire results in deployment of the handle portion 20 at different angles respective to each wire.

In each of the above disclosed embodiments, the rotating self-presenting handles can be operated manually as well. The handles can be manually deployed and set into the detent region, as well as manually removed from the detent region back to the stowed state. By permitting manual operation as well as active material actuation, the handles advantageously remain functional even during times of electrical failure or vehicle battery drain. Moreover, the self-presenting handles can be readily operated in a mixed mode, wherein the handle can be presented or stowed by actuation of the active material, and the reverse (stowing or presenting) can be done manually.

Further, the active material of the self-presenting handles can have any geometrical form suitable for rotating the handle, for example, without limitation, a wire, a strip, a sheet, a tube, and the like.

An activation device 30 is coupled to and in operative communication with the self-presenting handle assembly 12. The activation device 30, which is operative to selectively provide an activation signal to the self-presenting handle assembly 12 and change the position of the handle portion 20 and/or the detent 50 by changing at least one property of the SMA wire 26 and/or 58 respectively. The activation signal provided by the activation device 30 can include a heat signal, a magnetic signal, an electrical signal, a pneumatic signal, a mechanical signal, and the like, and combinations comprising at least one of the foregoing signals, with the particular activation signal dependent on the materials and/or configuration of the active material.

For instance, a heat signal may be applied for changing the property of the active material fabricated from SMA and/or SMP. An electrical signal may be applied for changing the property of the active material fabricated from EAP and/or electronic EAP's. A magnetic field may be applied (removed, or changed) for changing the property of the active material fabricated from magnetostrictive materials such as MSMA and MR elastomers.

In an exemplary embodiment, the handle portion 20 is in the stowed position when the active material 26 is in a passive mode, i.e., when no activation signal is being applied to the active material. Upon receipt of an activation signal, the change in a property of the active material 26 provides rotation to the axles and moves the handle portion 20 from the stowed position to a presented position, thereby making it accessible to a user. The reverse of the transition can be used to return the self-presenting handle from the presented position to the stowed position. In other words, terminating the activation signal can be effective to reverse the change in a property of the active material, thereby stowing the handle. In other embodiment, for example, those involving SMA as an active material such as in FIG. 2, discontinuing the activation signal will result in the transformation of the SMA wire to the martensitic phase but, absent the application of a reverse force on the handle which will stretch the SMA wire and stow the handle, the handle will remain in its deployed position. A return mechanism, such as the bias spring 28 of FIG. 2, can be optionally used to return the self-presenting handle to the opposite position upon termination of the activation signal or upon release of a detent or locking mechanism. For example, if an active material transitions the handle portion to the presented position when activated, a return mechanism may return the handle portion to the stowed position when the activation signal is terminated. In another example, where a locking mechanism, or even the active material (when activated), holds the handle portion in the stored position, a return mechanism can be effective to transition the member to the presented position upon release of the locking mechanism or deactivation of the active material. Such embodiments can be advantageous for those active materials which are inherently only effective as one-way actuators, for example SMA, which will be discussed in greater detail below.

Whatever the mode of activation, it is advantageous that the handle be stowed when in the passive mode, therefore no power is required for the continuous storage of the self-presenting handle. In other words, the only power required by the self-presenting handle assembly is for the short duration in which the handle portion must be presented for use, such as for assisting a passenger enter/exit the vehicle. If, however, for some reason the member must be presented for a longer than normal duration, or if the function of the self-presenting device is one in which prolonged deployment is required, for instance garment hooks, then a locking mechanism or detent can be added to the self-presenting handle, as described in detail above. Moreover, the self-presenting handle can optionally further comprise a load limiter 32. The load limiter 32 can be configured to limit the load to which the active material 26 is subjected, in order to preserve the cycle life of the active material. For example, the load limiter 32 can prevent the active material 26 from attempting to stow the handle when a certain load remains on the handle portion 20, such as hanging garments or a passenger's hand. In the latter case, the load limiter not only functions to preserve the cycle life of the handle assembly 12, but further acts as a safety mechanism by limiting the force level (i.e., rotation torque) applied to a hand when the handle is stowing.

A method of self-presenting a handle in a vehicle interior can comprise activating the active material in operative communication with the axle or the handle portion, wherein the active material undergoes a change in at least one property upon receipt of the activation signal. The change in a property is effective to provide rotation to the axle in a first direction and move the handle portion in the first direction from a first position to a second position. In one example, the rotation causes the handle portion to move to a position within and/or against the vehicle interior surface, such as a roof line, A-pillar, or the like, to a presented position in the vehicle's interior compartment, wherein the handle portion will now be accessible for use by a driver and/or passenger.

As described above, an activation device can be used to apply the activation signal to the active material(s) in an exemplary self-presenting handle assembly. The activation device can be operated in a variety of ways. For example, in one embodiment, use of a remote key fob, typically used to unlock a vehicle door, could also be configured to initiate the activation signal and present the handle for assistance in getting into the vehicle or hanging garments. Likewise, a wireless signal transmitter in the key fob in combination with an activation device sensor could be used to automatically activate the active material when the key fob is brought into physical proximity to the self-presenting device, thereby eliminating the need to press key fob buttons. In another embodiment, the activation signal could be manually activated. For example, inserting the vehicle key into a key hole in the vehicle door, or opening the door itself, could initiate the activation signal. Similarly, a push button or the like could be disposed preferably but not necessarily adjacent the self-presenting handle, wherein depressing the push button activates the activation signal in order to present the handle.

In any of the above methods, the activation signal can be turned off by time-out of a timer in communication with the self-presenting handle, or through the happening of some event, for example, closing of the vehicle door, or the vehicle being placed in gear, to deactivate the activation signal and return the handle to the power-off position, which can optionally be the stowed or presented position.

To reiterate, the active material enabled self-presenting handle of FIGS. 1 through 4 is merely an exemplary embodiment. Other handle shapes, assembly locations, detents, return mechanisms, and locking mechanism can be used in various combination, such as would be known to one of skill the art, to form a suitable self-presenting handle assembly.

As previously described, suitable active materials for the self-presenting handles include, without limitation, shape memory polymers (SMP), shape memory alloys (SMA), electroactive polymers (EAP), piezoelectric materials, ferromagnetic shape memory alloys, magnetorheological (MR) elastomers and electrorheological (ER) elastomers, and MR and ER fluids.

Shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate. The superelasticity effect is a mechanical type of shape memory. This effect is observed when the alloys are strained just above their transformation temperature. When the material is stressed at a temperature just above its transformation temperature to austenite, the applied stress transforms the austenite to martensite and the material exhibits increasing strain at constant applied stress, i.e. considerable deformation occurs for a relatively small applied stress. When the stress is removed, the martensite reverts to austenite and the material recovers its original shape.

Ferromagnetic Shape Memory Alloys (FSMA) are a subclass of SMA. FSMA can behave like conventional SMA materials that have a stress or thermally induced phase transformation between martensite and austenite. Additionally FSMA are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for latching-type applications where a delayed return stimulus permits a latching function. External magnetic fields are generally produced via soft-magnetic core electromagnets in automotive applications, though a pair of Helmholtz coils may also be used for fast response.

Exemplary ferromagnetic shape memory alloys are nickel-manganese-gallium based alloys, iron-platinum based alloys, iron-palladium based alloys, cobalt-nickel-aluminum based alloys, cobalt-nickel-gallium based alloys. Like SMA these alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range and the type of response in the intended application.

FSMA are alloys; often composed of Ni—Mn—Ga, that change shape due to strain induced by a magnetic field. FSMA have internal variants with different magnetic and crystallographic orientations. In a magnetic field, the proportions of these variants change, resulting in an overall shape change of the material. An FSMA actuator generally requires that the FSMA material be placed between coils of an electromagnet. Electric current running through the coil induces a magnetic field through the FSMA material, causing a change in shape.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Magnetorheological (MR) elastomers are a group of smart materials whose modulus can be controlled by the application of an external magnetic field. MR elastomer materials include, but are not intended to be limited to, an elastic polymer matrix comprising a suspension of ferromagnetic or paramagnetic particles. Suitable particles include iron; iron alloys, such as those including aluminum, silicon, cobalt, nickel, vanadium, molybdenum, chromium, tungsten, manganese and/or copper; iron oxides, including Fe2O3 and Fe3O4; iron nitride; iron carbide; carbonyl iron; nickel and alloys of nickel; cobalt and alloys of cobalt; chromium dioxide; stainless steel; silicon steel; and the like.

The particle size should be selected so that the particles exhibit multiple magnetic domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR elastomer composition.

Suitable polymer matrices include, but are not limited to, poly-alpha-olefins, natural rubber, silicone, polybutadiene, polyethylene, polyisoprene, and the like. Similar to shape memory alloys, "shape memory polymer" generally exist in two phases. Shape memory polymer refers to a polymeric material, which exhibits a change in a property, such as an elastic modulus, a shape, a dimension, a shape orientation, or a combination comprising at least one of the foregoing properties upon application of an activation signal. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing. For the self-presenting handles as disclosed herein, SMP are suitable for use in, among other things, detent and latching mechanisms.

Generally, SMP are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment.

For SMP comprising (n) segments, the SMP is said to have a hard segment and (n-1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load. The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMP with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMP exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent of the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMP in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

Optionally, the SMP can be selected to provide stress-induced yielding, which may be used directly (i.e. without heating the SMP above its thermal transition temperature to 'soften' it) to release a detent or latch in the case of significant applied load. The maximum strain that the SMP can withstand in this case can, in some embodiments, be comparable to the case when the SMP is deformed above its thermal transition temperature.

Although reference has been, and will further be, made to thermoresponsive SMP, those skilled in the art in view of this disclosure will recognize that photoresponsive, moisture-responsive SMP and SMP activated by other methods may readily be used in addition to or substituted in place of thermoresponsive SMP. For example, instead of using heat, a temporary shape may be set in a photoresponsive SMP by irradiating the photoresponsive SMP with light of a specific wavelength (while under load) effective to form specific crosslinks and then discontinuing the irradiation while still under load. To return to the original shape, the photoresponsive SMP may be irradiated with light of the same or a different specific wavelength (with the load removed) effective to cleave the specific crosslinks. Similarly, a temporary shape can be set in a moisture-responsive SMP by exposing specific functional groups or moieties to moisture (e.g., humidity, water, water vapor, or the like) effective to absorb a specific amount of moisture, applying a load or stress to the moisture-responsive SMP, and then removing the specific amount of moisture while still under load. To return to the original shape, the moisture-responsive SMP may be exposed to moisture (with the load removed).

Suitable shape memory polymers, regardless of the particular type of SMP, can be thermoplastics, thermosets-thermoplastic copolymers, interpenetrating networks, semi-interpenetrating networks, or mixed networks. The SMP "units" or "segments" can be a single polymer or a blend of polymers. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly (amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly (lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly (octadecyl vinyl ether), poly(ethylene vinyl acetate), polyethylene, poly(ethylene oxide)-poly(ethylene terephthalate), polyethylene/nylon (graft copolymer), polycaprolactones-polyamide (block copolymer), poly(caprolactone)diniethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

As will be appreciated by those skilled in the art, conducting polymerization of different segments using a blowing agent can form a shape memory polymer foam, for example, as may be desired for some applications. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N' dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen, and the like.

The application and functionality of the self-presenting device will determine which active material is best suited for the particular device. Factors such as force, displacement, actuation time, and the like can be used to determine which type of active material is most appropriate. For instance, where an application requires an activation time of about 1 second or greater, an SMA or SMP can be appropriate. Where an application requires shorter activation times, an EAP, a piezoelectric, or an MR elastomer can be used.

As stated above, the self-presenting handle assemblies as disclosed herein advantageously employ active materials to reversibly present and stow the handle. The active material enabled self-presenting handle assemblies are lightweight, inherently robust, and lower in complexity compared to other electromechanical means that might be used to create vehicle self-presenting handles. Utilizing active materials to affect the presentation of the handle provides a handle of increased simplicity, while reducing assembly volume and the energy requirements for activation compared to hypothetical electromechanically activated handles due to higher energy densities. Moreover, the self-presenting handles described herein are also of low-cost and of easily adaptable design that can be integrated with limited changes to the existing vehicle interior structure.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A self-presenting handle assembly, comprising:
a handle portion operatively connected with an axle rotatably mounted in a housing of a rigid support; and
an active material in operatively connected with the axle or the handle portion, wherein the active material is configured to undergo a change in at least one property upon receipt of an activation signal, wherein the change in at least one property is effective to provide rotation of the axle in a first direction and move the handle in the first direction from a stowed position to a presented position;
a return mechanism operatively connected with the axle or the handle portion configured to provide rotation of the axle in a second direction counter to the first direction upon discontinuation of the activation signal, wherein rotation of the axle is effective to move the handle portion from the presented position to the stowed position; and
an activation device communicatively coupled to the material and operable to selectively generate the signal.

2. The self-presenting handle assembly of claim 1, wherein the return mechanism comprises a second active material.

3. The self-presenting handle assembly of claim 2, wherein the second active material comprises a shape memory alloy wire, wherein the shape memory alloy wire has a superelastic shape memory effect which is effective to move the handle portion from the second position to the first position.

4. The self-presenting handle assembly of claim 1, wherein the active material comprises a shape memory alloy, a ferromagnetic shape memory alloy, a shape memory polymer, a magnetorheological elastomer, an electrorheological elastomer, an electroactive polymer, a piezoelectric material, or combinations comprising at least one of the foregoing active materials.

5. The self-presenting handle assembly of claim 1, wherein the change in the at least one property comprises a change in a shape, a dimension, a phase, a shape orientation, a stiffness, or combinations comprising at least one of the foregoing properties.

6. The self-presenting handle assembly of claim 1, wherein the activation signal comprises a thermal activation signal, an electric activation signal, a magnetic activation signal, a chemical activation signal, a mechanical load, or a combination comprising at least one of the foregoing activation signals.

7. The self-presenting handle assembly of claim 1, further comprising an activation device configured to provide the activation signal to the active material.

8. The self-presenting handle assembly of claim 1, wherein in the first position the handle portion is stowed relative to a surrounding surface and in the second position the handle portion is presented relative to the surrounding surface.

9. The self-presenting handle assembly of claim 1, wherein in the first position the handle portion is presented relative to a surrounding surface and in the second position the handle portion is stowed relative to a surrounding surface.

10. The self-presenting handle assembly of claim 1, further comprising a detent operatively connected with the handle portion configured to hold the handle portion in a selected one of the first and second positions.

11. The self-presenting handle assembly of claim 7, where the detent comprises:
  a catch in slidable communication with a complimentary cavity, wherein in the catch is configured to frictionally engage an end of the handle portion;
  a compression spring operatively connected with the catch and the cavity, wherein the compression spring is configured to force the catch outward from the cavity;
  an active material operatively connected with the catch and the cavity, wherein the active material is configured to undergo a change in at least one property upon receipt of an activation signal, wherein the change in at least one property is effective to retract the catch downward into the cavity, such that the cavity is no longer in frictional engagement with the end of the handle portion.

12. The self-presenting handle assembly of claim 1, further comprising a locking mechanism configured to lock the handle portion in a selected one of the first and second positions.

\* \* \* \* \*